US012643060B2

(12) United States Patent
Ojanne et al.

(10) Patent No.: US 12,643,060 B2
(45) Date of Patent: Jun. 2, 2026

(54) DEVICE AND METHOD FOR CLEANING WATER ACCRUING FROM DRILLING IN THE GROUND

(71) Applicant: ROTOTEC AB, Upplands Väsby (SE)

(72) Inventors: Mikko Ojanne, Järfälla (SE); Hannu Mikael Puolitaival, Vantaa (FI)

(73) Assignee: ROTOTEC AB, Upplands Väsby (SE)

( * ) Notice: Subject to any disclaimer, the term of this patent is extended or adjusted under 35 U.S.C. 154(b) by 454 days.

(21) Appl. No.: 18/286,538

(22) PCT Filed: Apr. 28, 2022

(86) PCT No.: PCT/SE2022/050415
§ 371 (c)(1),
(2) Date: Oct. 11, 2023

(87) PCT Pub. No.: WO2022/231508
PCT Pub. Date: Nov. 3, 2022

(65) Prior Publication Data
US 2024/0198257 A1     Jun. 20, 2024

(30) Foreign Application Priority Data

Apr. 30, 2021    (SE) .................................... 2150554-0

(51) Int. Cl.
*B01D 21/08* (2006.01)
*B01D 21/00* (2006.01)
(Continued)

(52) U.S. Cl.
CPC ......... *B01D 21/08* (2013.01); *B01D 21/0087* (2013.01); *E21B 21/065* (2013.01); *B01D 21/003* (2013.01); *B01D 21/24* (2013.01)

(58) Field of Classification Search
CPC .. B01D 21/003; B01D 21/0087; B01D 21/08; B01D 21/24; B01D 21/2405; B01D 21/2444; E21B 21/065; E21B 43/2607
See application file for complete search history.

(56) References Cited

U.S. PATENT DOCUMENTS 4,326,952 A     4/1982  Blake
4,710,290 A  *  12/1987  Briltz ................. B01D 21/0042
                                            210/205
(Continued)

FOREIGN PATENT DOCUMENTS

AU        2005279702 B2    10/2007
DE            19818539 A1    11/1999
(Continued)

OTHER PUBLICATIONS

Extended European Search Report from corresponding Application No. 22796273.5 mailed on Feb. 11, 2025, 8 pages.
(Continued)

*Primary Examiner* — Dirk R Bass
(74) *Attorney, Agent, or Firm* — Tucker Ellis LLP

(57) ABSTRACT

Device (200) for cleaning grey water containing particulate material, comprising a container (201) in turn comprising a water entry (202); a slurry exit (204); a cleansed water exit (203); and a sedimentation volume (220). The invention is characterised in that the container further comprises a flocculant provision means, arranged to add a flocculant (212) to grey water entering via the water entry, so that grey water having entered said sedimentation volume after such adding contains said flocculant, in that the flocculant provision means comprises a vertical chute (213) arranged to convey, via gravity, said grey water from an upper part of said container to be released via an open lower end (215) of the chute into said sedimentation volume at a height of at the most 1 m above a bottom (221) of said sedimentation
(Continued)

volume, the chute having a cross-sectional area of at least 0.1 m2. The invention also relates to a method.

13 Claims, 13 Drawing Sheets

(51) Int. Cl.
B01D 21/24 (2006.01)
E21B 21/06 (2006.01)

(56) References Cited

U.S. PATENT DOCUMENTS 6,475,381 B1 11/2002 Gustafsson
8,133,394 B2 * 3/2012 Gustafsson ........ B01D 21/0018
210/624

FOREIGN PATENT DOCUMENTS

| | | | |
|---|---|---|---|
| FR | 2439036 | A1 | 5/1980 |
| GB | 170225 | A | 10/1921 |
| GB | 1247728 | A | 9/1971 |
| GB | 2302290 | A | 1/1997 |
| SE | 512069 | C2 | 1/2000 |
| WO | 2005121495 | A1 | 12/2005 |
| WO | 2008010770 | A1 | 1/2008 |

OTHER PUBLICATIONS

International Search Report from corresponding International Application No. PCT/SE2022/050415, mailed on Jul. 14, 2022, 4 pages.
BAGA Water Technology AB, "BAGA Easy: Wastewater plant for sewage water 1-2 households," Ed. 1109, Aug. 14, 2014, 12 pages.
International Preliminary Report on Patentability from corresponding International Application No. PCT/SE2022/050415, mailed on Aug. 25, 2023, 35 pages.

* cited by examiner

DEVICE AND METHOD FOR CLEANING WATER ACCRUING FROM DRILLING IN THE GROUND

The present invention relates to a method and a device for cleaning grey water, in particular grey water accruing from drilling in the ground, such as drilling through rock. The present application finds particular use for treating water from drilling energy wells, such as energy wells of the type used in geothermal heating and cooling systems.

Such grey water may be ground water brought up of the ground surface in connection to such drilling.

In general, grey water suitable for treatment using the present invention includes such grey water that holds varying amounts of particulate material, such as stone flour and/or sand of various particle sizes.

In many drilling and ground processing applications, such as in connection to single-household houses, space is limited and it may not be possible to provide large equipment for treating grey water. Emitting the produced grey water as-is into a stormwater drain or similar is normally not possible due to regulation. Emitting the produced grey water onto the ground in the vicinity of the production site is typically not desired, and/or not possible to do due to limited water-evacuation capabilities of the ground.

Hence, there is a need for a small-scale grey water treatment solution, capable of locally treating produced grey water so that it can safely be disposed of, such as into a storm drain in connection to the production site.

Such solution should be capable of handling amounts of grey water per time unit typically produced when drilling one or several energy wells into the ground, such as several hundred meters deep energy wells, and to produce cleaned water holding sufficiently low amounts of particulate material so as to be allowed to emit such water into a local storm drain or similar. Typically, this translates into less than about 0.5 g particulate material per litre cleansed water, or similar low concentrations.

SE 527642 B discloses a grey water processing device built into a container, the interior of the container being divided into two parallel sedimentation flows of different cross-section size. A slanted separation wall (8) divides each such sedimentation flow into two separate sedimentation volume, an upstream volume and a downstream volume.

The slanted separation wall (8) has a through flow channel, having an upper inlet (19) and a lower outlet (20). Contained particulate material settles in the grey water in the upstream volume, after which the grey water flows from inlet (19) to outlet (20), passing thus to the downstream volume. The sedimentation continues in the downstream volume, and the cleansed grey water then exits the container via an exit (23).

There are a number of problems with this known solution.

Firstly, sedimentation is slow. In many practical applications, sedimentation to sufficient clarity typically takes days, constituting a problem in terms of efficiency and total throughput per time unit.

Secondly, there is a problem to empty the sedimented particulate material from the container. Normally, the container will be transported away from the grey water production site for deposition or further processing. If the transportation takes place using a trailer, emptying can take place either using sludge suction or via tipping.

Sludge sucking is complicated and slow, and requires specialised equipment. Tipping has proven to cause problems with clogging of the through flow channel (between inlet 19 and outlet 20), since the particulate-material slurry during tipping tends to flow counter-directionally back into said flow channel via the outlet 20.

Hence, it would be desirable to achieve a grey water cleaning solution capable of treating higher volumes of grey water per time unit into sufficient clarity for emission, and which is also capable of simpler emptying of the processing vessel.

The present invention solves these problems.

Hence, the invention relates to a device for cleaning grey water containing particulate material, comprising a container in turn comprising a water entry; a slurry exit; a cleansed water exit; and a sedimentation volume, the method being characterised in that the container further comprises a flocculant provision means, arranged to add a flocculant to grey water entering via the water entry, so that grey water having entered said sedimentation volume after such adding contains said flocculant, in that the flocculant provision means comprises a vertical chute arranged to convey, via gravity, said grey water from an upper part of said container to be released via an open lower end of the chute into said sedimentation volume at a height of at the most 1 m above a bottom of said sedimentation volume, the chute having a cross-sectional area of at least 0.1 m².

Moreover, the invention relates to a method for cleaning grey water containing particulate material, comprising the following steps: a) providing a device of said type, comprising a container and a flocculant; b) providing grey water to said water entry; c) allowing the grey water to pass via said chute into said sedimentation volume, the particulate material settling on a bottom of said sedimentation volume; d) evacuating cleansed grey water via said cleansed water exit; and e) evacuating sedimented particulate material via said slurry exit.

In the following, the invention will be described in detail, with reference to exemplifying embodiments of the invention and to the enclosed drawings, wherein:

The first two digits of the reference numerals of FIGS. 1-12 denote the same or corresponding parts. In FIGS. 1-4, the first digit for each reference numeral is "1", signifying the first aspect; while in FIGS. 2-12, the first digit for each reference numeral is "2", signifying the second aspect.

FIRST ASPECT

Figure 1:
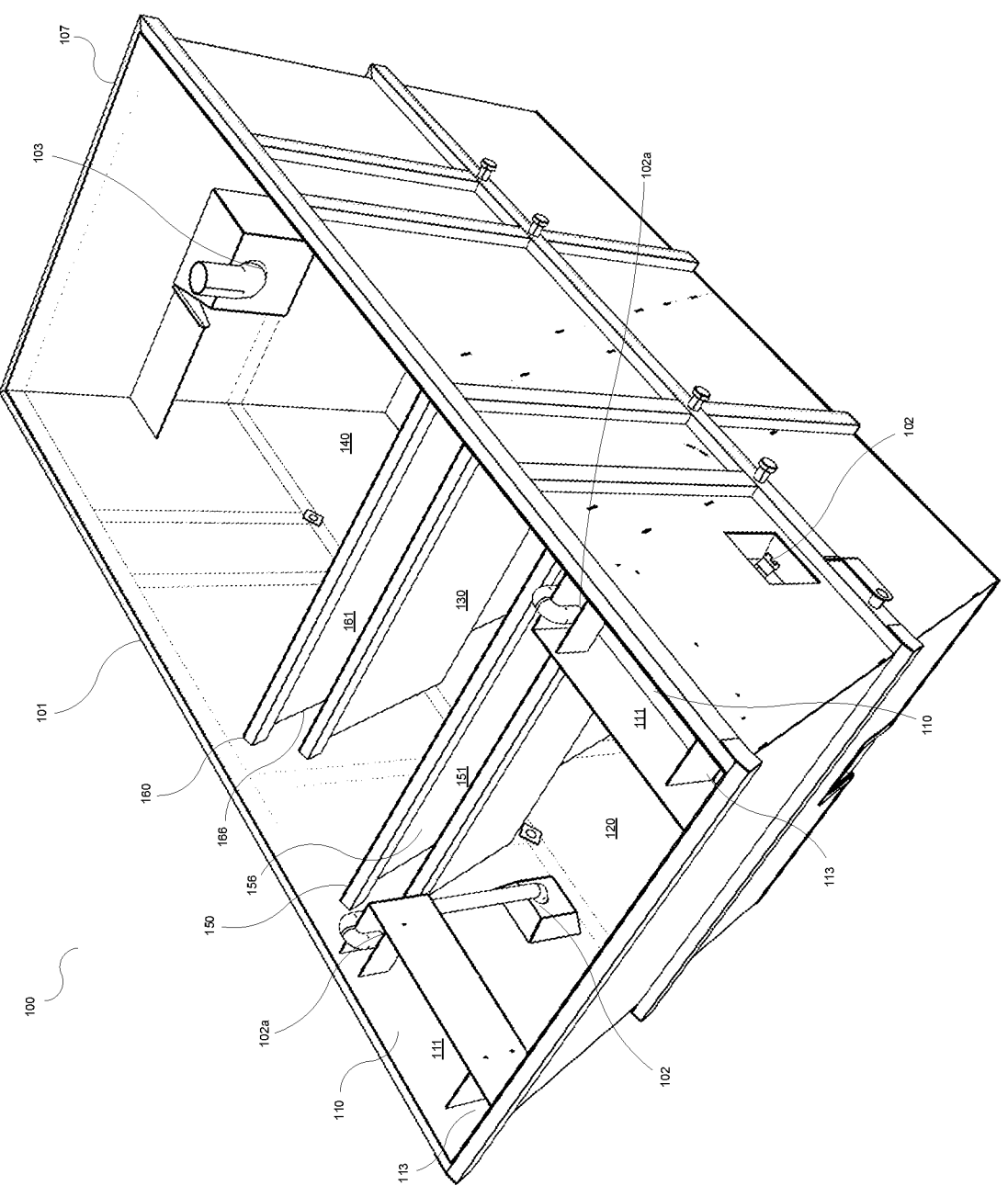
FIG. 1 is a perspective top view of a device according to a first aspect.
Figure 2:
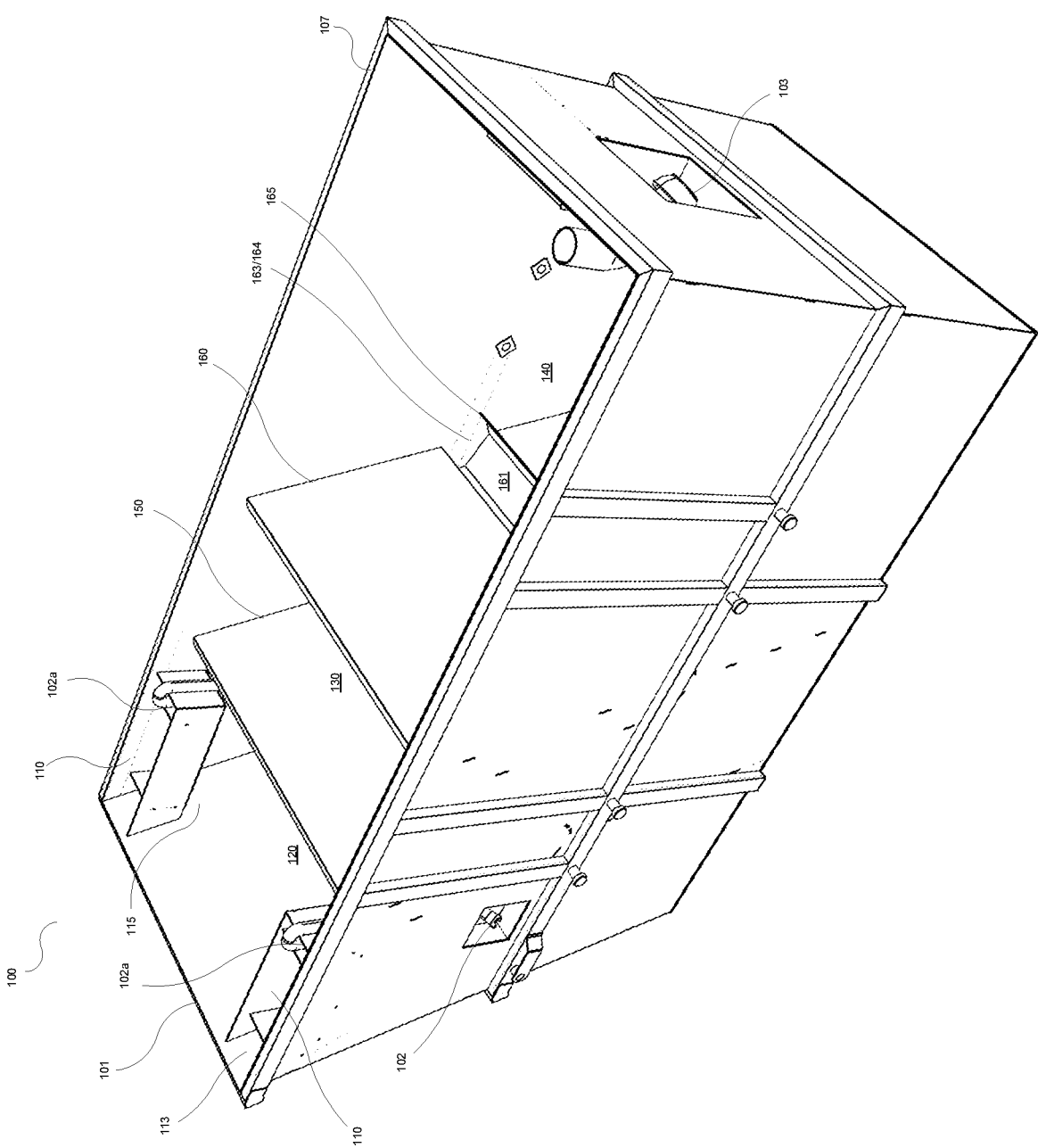
FIG. 2 is a perspective top view of the device shown in FIG. 1, seen from a different perspective.

Hence, FIGS. 1-4 illustrate a device 100 according to the first aspect. The device 100 is specifically arranged for cleaning grey water, containing particulate material. For instance, such grey water may be water from a drilled geothermal well, for instance such a well being drilled into soil and/or bedrock.

Preferably, the grey water has a mean particle size of at the most 80 μm, such as at the most 40 μm. Also, the grey water may contain at least 50 μg/l, such as at least 200 μg/l, particulate material, upon entry to the container. The particulate material may be mineral material, such as granite or similar.

The device 200 described below is also specifically arranged for cleaning such grey water.

The device 100 comprises a container 101. Preferably, the container 101 is of standard size and shape, so that the container 101 can be lifted onto and removed using a standard truck or lorry. In FIGS. 1-4, standard fittings for lifting and handling are shown, for instance. The corresponding applies for container 201, described below.

The container 101 in turn comprises a water entry 102, via which said grey water is provided during operation, such as by pumping or by self-pressure. The water entry may comprise a quick-connector, such as a standard quick-connector for connecting a grey water supply hose. For instance, a pressurized grey water hose may be connected to the water entry 102, thereby creating an open communication between the container 101 and the hose in question.

Correspondingly, the container 101 comprises a water exit 103, arranged to provide cleansed water having been processed through the device 100. The water exit 103 may have a quick-connector, such as a standard hose quick-connector, in a way similar to water entry 102, for connecting a cleansed water hose to the container 101.

The container 101 furthermore comprises at least one slanted separation wall 150, arranged to separate an upstream sedimentation volume 120 of the container 101 from a downstream sedimentation volume 130 of the container 101. Since the example illustrated in FIGS. 1-4 comprises three sedimentation volumes 120, 130, 140, a second slanted separation wall 160 is arranged to separate the sedimentation volume 130 in a capacity as an "upstream" sedimentation volume in relation to sedimentation volume 140, then being the "downstream" sedimentation volume in relation to the separation wall 150.

As used herein, "upstream" and "downstream" relate to a general or main flow direction of water through the container 101, from the water entry 102 to the water exit 103 via said sedimentation volumes 120, 130. It is realized that the example shown in FIGS. 1-4 is associated with a generally linear water flow, but that more complex geometries are possible. In the linear flow shown in FIGS. 1-4, the water entry 102 is arranged substantially at one short end of the container 101, while the water exit 103 is arranged substantially at a second, opposite short end of the container 101. Hence, said flow direction can be substantially the same through the container 101, or change direction along the path of the water flowing from water entry 102 to water exit 103.

As can be seen from FIGS. 1-4, at least one, such as at least two, such as all, of said at least one separation wall 150, 160 comprises a respective through channel 151, 161 for water flowing past the separation wall 150, 160 in question. Each such through channel 151, 161 has a respective upper inlet 152, 162 and a respective lower outlet 153, 163, so that the water can flow via said through channel 151, 161, from the inlet 152, 162 to the outlet 153, 163, by gravity, from said upstream sedimentation volume 120, 130 to said downstream sedimentation volume 130, 140. The water will normally enter each through channel 151, 161 via overflow into inlet 152, 162. There is advantageously no other way, apart from via said through channel 151, 161, for the grey water to flow from an upstream sedimentation volume 120, 130 to a downstream sedimentation volume 130, 140.

As used herein, "upper" and "lower" relates to the normal (vertical) plumb line. In FIGS. 1-12, the device 100, 200 is illustrated in a generally upright operational orientation, so that an open top 107, 207 is open upwards. As used herein, "height", "upper", "lower" and similar expressions hence refer to measurements along the vertical when the device 100, 200 is in said upright orientation, typically with a bottom 121, 131, 141, 221 substantially horizontal.

According to the first aspect, the container 101 further comprises a flocculant provision means 110, arranged to add a flocculant 112 (schematically illustrated in FIG. 3) to the grey water entering via water entry 102, so that grey water having entered said upstream sedimentation volume 120 after such adding contains said flocculant 112.

Preferably, all grey water entering via water entry 102 passes a flocculant adding space 111 in which flocculant is added to the grey water. However, it may also be the case that only part of the grey water entering via water entry 102 passes such a flocculant adding space 111, while another part of the entering grey water does not pass the flocculant adding space before entering an upstream-most sedimentation volume 120. What is important is that, due to the operation of the flocculant provision means 110, the grey water being present, during cleaning operation, in the upstream-most sedimentation volume 120 on average has a concentration of flocculant which is effective to flocculate particulate material present in said grey water, so that such flocculated particulate material has time to sediment before the grey water exits via exit 103. What is meant by sufficient amounts of such flocculant will depend on what flocculant is used, the total size of the sedimentation volumes 120, 130, 140, a flow volume per time unit of grey water through the container 101, the concentration of particulate material in the grey water, and so forth.

The flocculant adding space 111 (and correspondingly for the space 211, see below) is preferably a closed space, in the sense that grey water entering via water entry 102 will be forced into direct contact with the flocculant 112 held in the flocculant adding space 111 in a confined volume, the confined volume being much smaller than the total volume of the container 101, such as at the most 1% of the total volume of the container 101, before being released into the sedimentation volume 120.

Furthermore according to this first aspect, the lower outlet 153, 163 of each of said one or more through channels 151, 161 is shaped to direct a flow of water flowing downwards through the through channel 151, 161 obliquely upwards upon entry into the downstream sedimentation volume 130, 140 into which the lower outlet 153, 163 opens out. This oblique upwards flow is schematically illustrated using dotted arrows in FIG. 3, and is preferably directed with a non-zero upwards component as well as a non-zero component in said general flow direction, such as towards the water exit 103.

The present inventors have discovered that the combination of flocculant addition and this upwards-directed water flow from a slanted separation wall 150, 160 into a downstream sedimentation volume 130, 140 achieves very efficient cleansing of the grey water. Namely, field experiments have proven that, when a flocculant is used so as to speed up a sedimentation of particulate material in the sedimentation volume 130, 140 in question, the upwards-directed water flow is sufficient to avoid that the water added to the sedimentation volume 130, 140 in question via the outlet 153, 163 in question stirs up already sedimented particulate material, but that such added water can instead enter the downstream sedimentation volume 130, 140 in question for sedimenting without disturbing the already performed sedimentation of previously added water in the downstream sedimentation volume 130, 140 in question more than marginally. Furthermore, for the achievement of this effect it is advantageous to use a flocculant, since adding flocculant to the grey water increases the viscosity of the grey water, increasing the above-described benefit of the upwards-directed water flow. In addition, the sudden flow direction change at the bottom of the through channel 151, 161, due to the flange 155, 255 or corresponding detail, achieves that the downwards-flowing grey water flushes away any larger particles that may otherwise be stuck in the through channel 151, 161.

Hence, this way a normal container 101 can be equipped with one or more slanting separation walls 150, 160 having such specifically designed through channel 151, 161 outlets 153, 163, hence providing a very efficient sedimentation device to cleanse grey water of the above-discussed type, in a very simple and sturdy design.

That the flow of water flowing "flows obliquely upwards" upon entry into the downstream sedimentation volume 130, 140 may mean that the water flows with an average flow direction which has a non-zero upwards angle in relation to the horizontal, such as at least 10° upwards in relation to the horizontal. It may also be the case that a laminarly flowing share, that may constitute a majority of the total water flow through the channel 151, 161 in question, of the water exiting via lower outlet 153, 163 has such an upwards-directed flow direction, while any smaller turbulently flowing exiting water may locally have other flow directions. At any rate, the through channel 151, 161 and the outlet 153, 163 are designed so that at least a majority of the water exiting into the sedimentation volume 130, 140 at any given point in time during a steady-flow state flows at an oblique upwards angle in a laminar manner and not turbulently.

As is illustrated in FIGS. 1-4, the exemplifying embodiment has two water entries 102, one on each side of the container 101. This provides an opportunity to connect several parallel flows of grey water to be cleansed. In case the container 101 comprises two or more such grey water entries 102, each such entry 102 may be associated with its own respective flocculant provision means 110 of the present type. However, two or more parallel water entries 102 may also be arranged to provide grey water to one and the same flocculant adding space 101 (as is the case in device 200, see below).

In this and in other cases, each flocculant provision means 110 may comprise a water conduit 113, leading from the flocculant adding space 111, such as via overflow from the flocculant adding space 111, to the upstream-most sedimentation volume 120, via a water exit 115. The water entry 102 in question may comprise an outlet 102a, releasing the grey water to be cleansed into the flocculant adding space 111. Then, the outlet 102a may be arranged higher than the exit 115. As is illustrated in FIGS. 1-4, the outlet 102a may be arranged in a volume of the flocculant provision means 110 connected to the flocculant adding space 111, via a wall under which the grey water must flow in order to reach the flocculant adding space 111.

As mentioned, the flocculant provision means 110 may comprise the flocculant adding space 111, in turn containing said flocculant 112. The flocculant may be a solid-state flocculant 112, such as aluminium sulphate, past which grey water entering via the water entry 102 flows, in direct contact with said flocculant 112, before entering said upstream sedimentation volume 120. The solid-state flocculant 112 may be provided in any suitable manner in order to reach a sufficient flocculant concentration in the grey water, such as by simply placing a piece of the solid-state flocculant in the flocculant adding space 111; by providing a water-permeable textile bag in the flow of grey water, where the flocculant 112 is provided inside the textile bag; by placing the flocculant 112 on a grid or raster through which the grey water flows down, past the flocculant; or in any other suitable manner. For instance, the flocculant could also be a liquid flocculant, added to the grey water arriving via the water entry 102 using a dosimeter or similar.

Each or all of said through channels 151, 161 may comprise a flange 155, 165, in turn constituting a lower exit part 154, 164 of said lower outlet 153, 163 of the through channel 151, 161 in question. This is perhaps best illustrated in FIG. 3. The flange 155, 165 may then extend from the separation wall 150, 160 into the downstream sedimentation volume 130, 140 in question obliquely upwards from the separation wall 150, 160 in question.

The present inventors have discovered that such a protruding flange 155, 165, forming the flow of the water out from the lower outlet 153, 163 to be obliquely upwards as described above, provides an efficient barrier for sedimented particulate material when the container 101 is emptied by tilting it (by raising the right-hand side in FIG. 3) so that sediments resting on the bottom 131, 141 of the sedimentation volume 130, 140 in question pour out, over the separation wall 150, 160 and further out from the container 101. The barrier in question will then prevent such particulate material from entering the through channel 151, 161, where it may run the risk of blocking the through channel 151, 161 in turn requiring cleaning of the through channel 151, 161 before the device 100 can be used again for cleaning grey water.

Advantageously, the flange 155, 165 protrudes at least 10 cm, such as at least 20 cm, from the separation wall 150, 160. The exit 154, 164 may be maximally 50 cm of height, such as maximally 30 cm of height.

The exit 154, 164, such as formed by said flange 155, 165, preferably forms a smooth, or at least a step-wise smooth, bottom of the through channel 151, 161, leading the water flowing through the exit along a non-abrupt path while changing the flow direction of the water in question before spilling out into the downstream sedimentation volume 130, 140 in question.

In the preferred embodiment illustrated in FIGS. 1-4, the separation wall 150, 160 constitutes a limiting wall 156, 166 of the through channel 151, 161, in the sense that the through channel 151, 161 is formed at least partly by the separation wall 150, 160 constituting one of its separation walls. Then, the through channel 151, 161 may pass through a through hole 157, 167 in the separation wall 150, 160 at the lower outlet 153, 163. In other words, the through hole 157, 167 may constitute the entire or part of the exit 154, 164 in question, such as in combination with said flange 155, 165.

Figure 3:
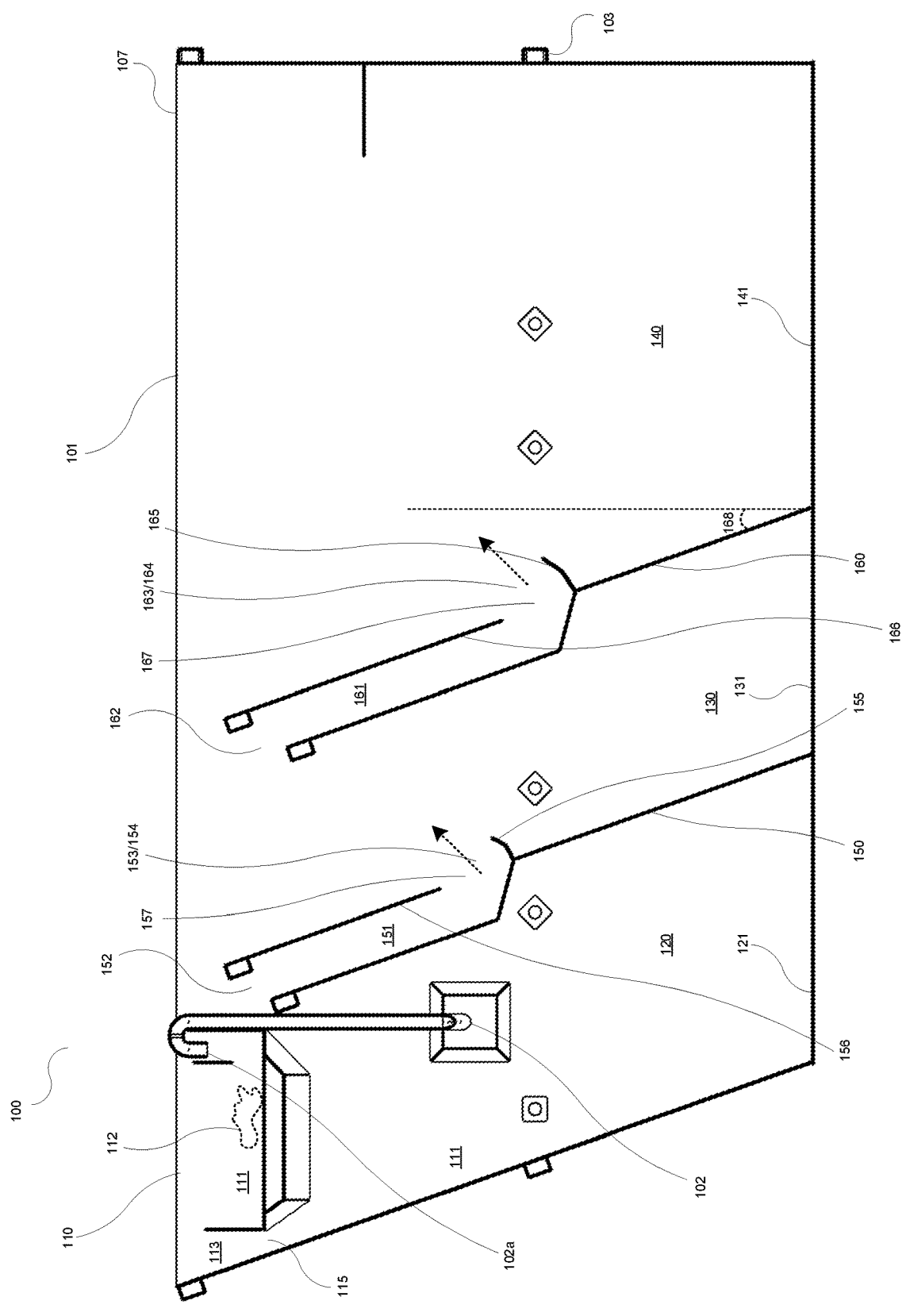
FIG. 3 is a side plan view of the device shown in FIG. 1, with a first cross-section removed, said first cross-section running through a flocculant provision means of the device in question.
Figure 4:
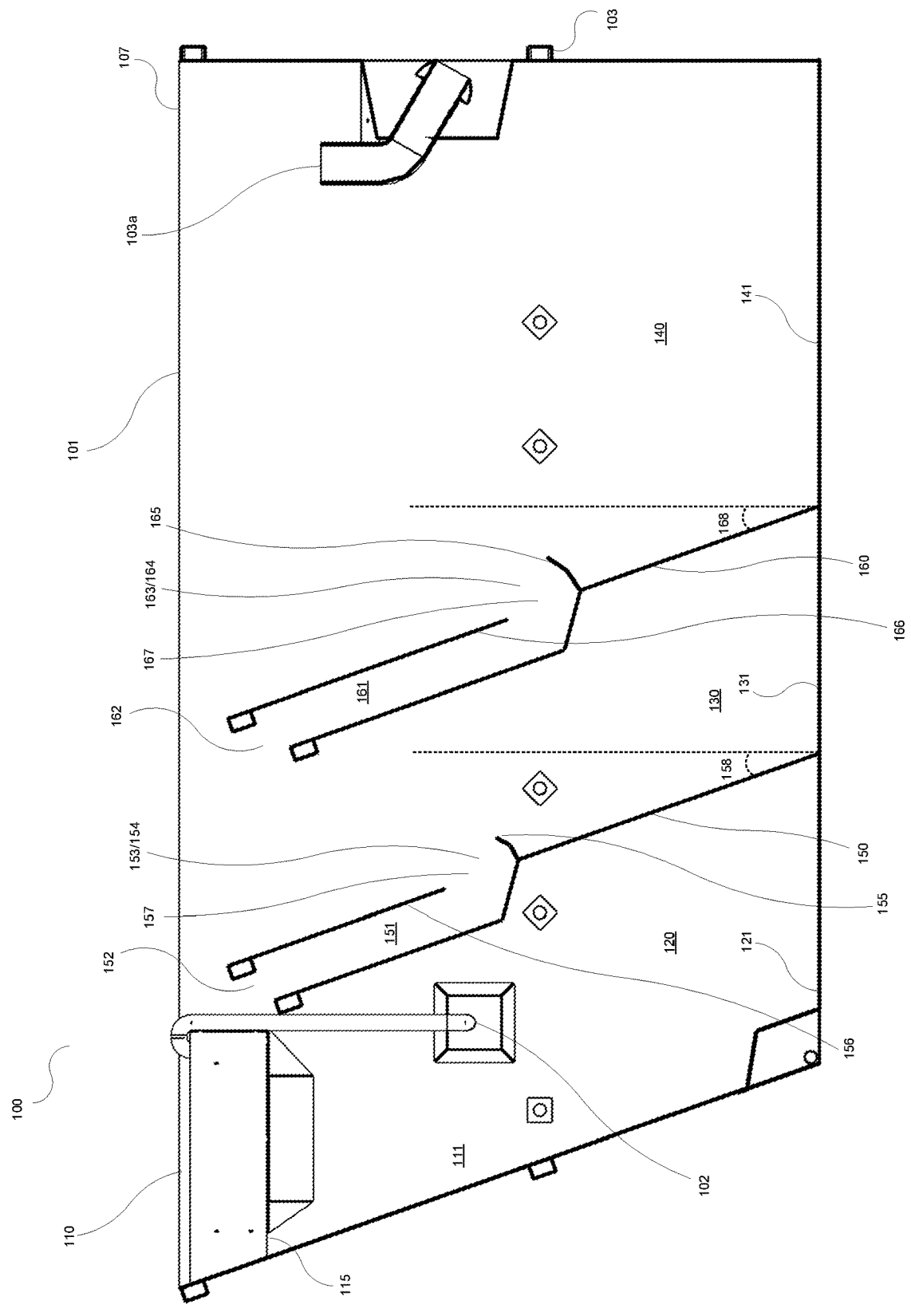
FIG. 4 is a side plan view of the device shown in FIG. 1, with a second cross-section removed, said second cross-section running through a water exit of the device in question.
Figure 5:
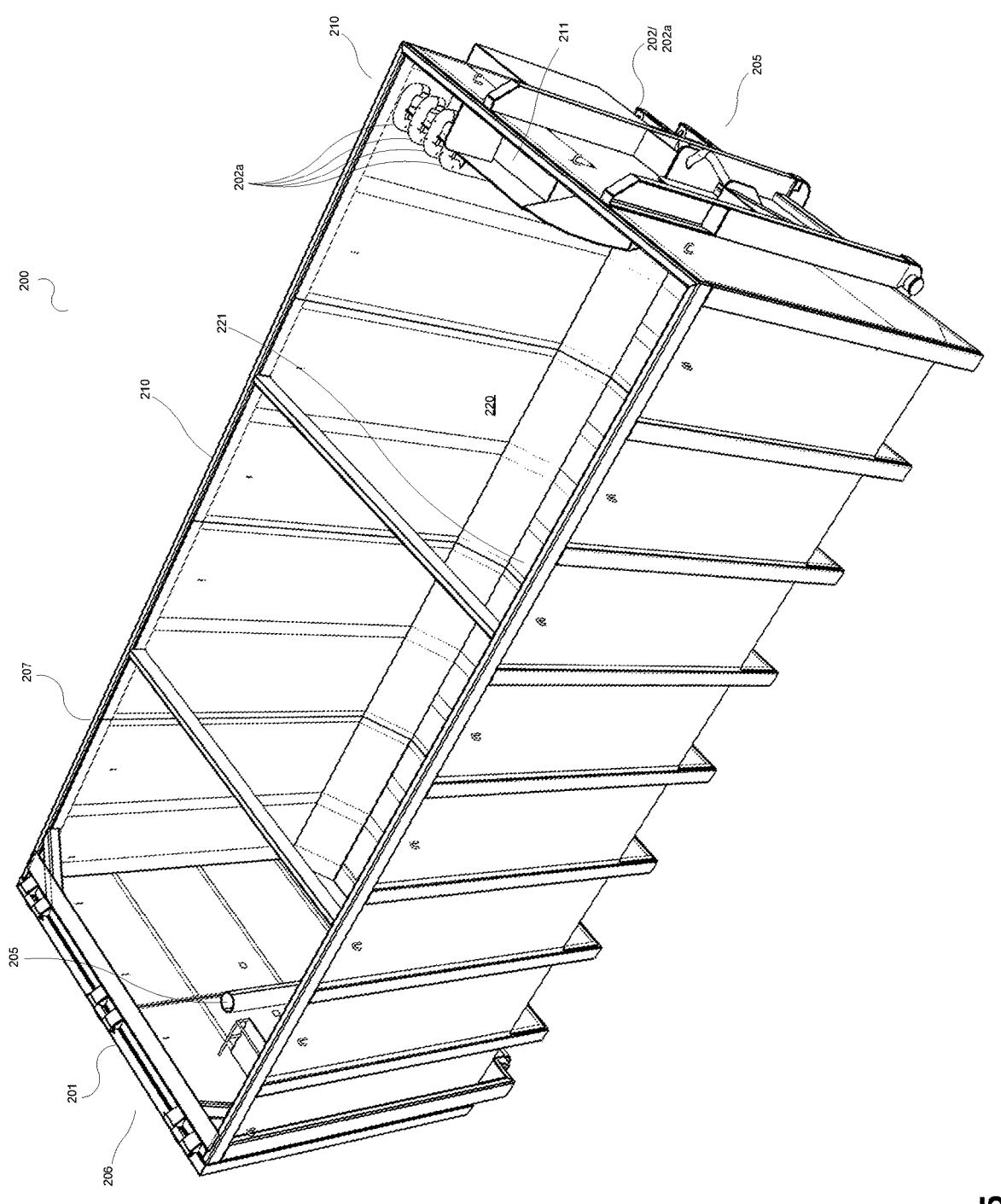
FIG. 5 is a perspective top view of a device according to a second aspect.
Figure 6:
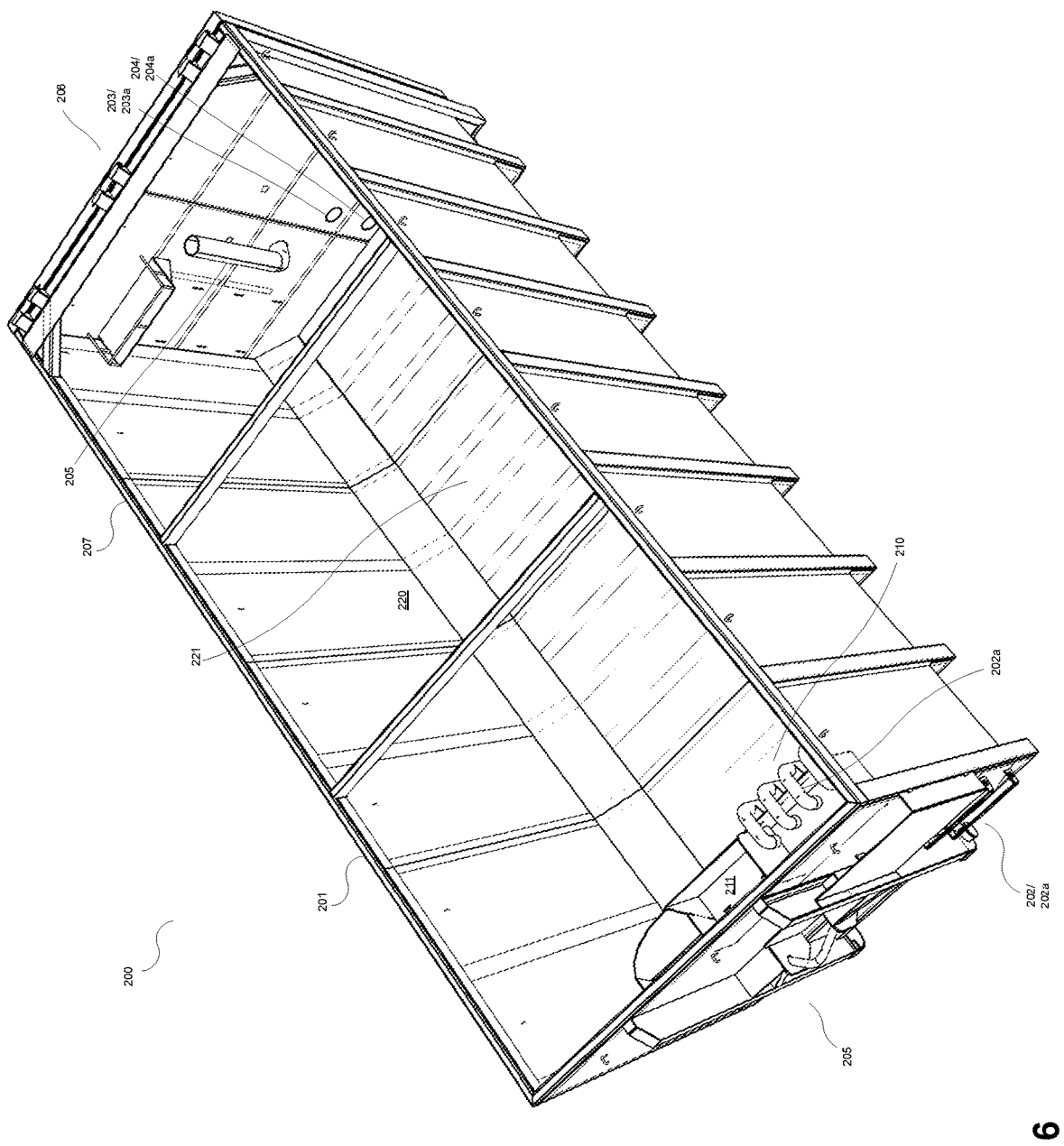
FIG. 6 is a perspective top view of the device shown in FIG. 5, seen from a different perspective.
Figure 7:
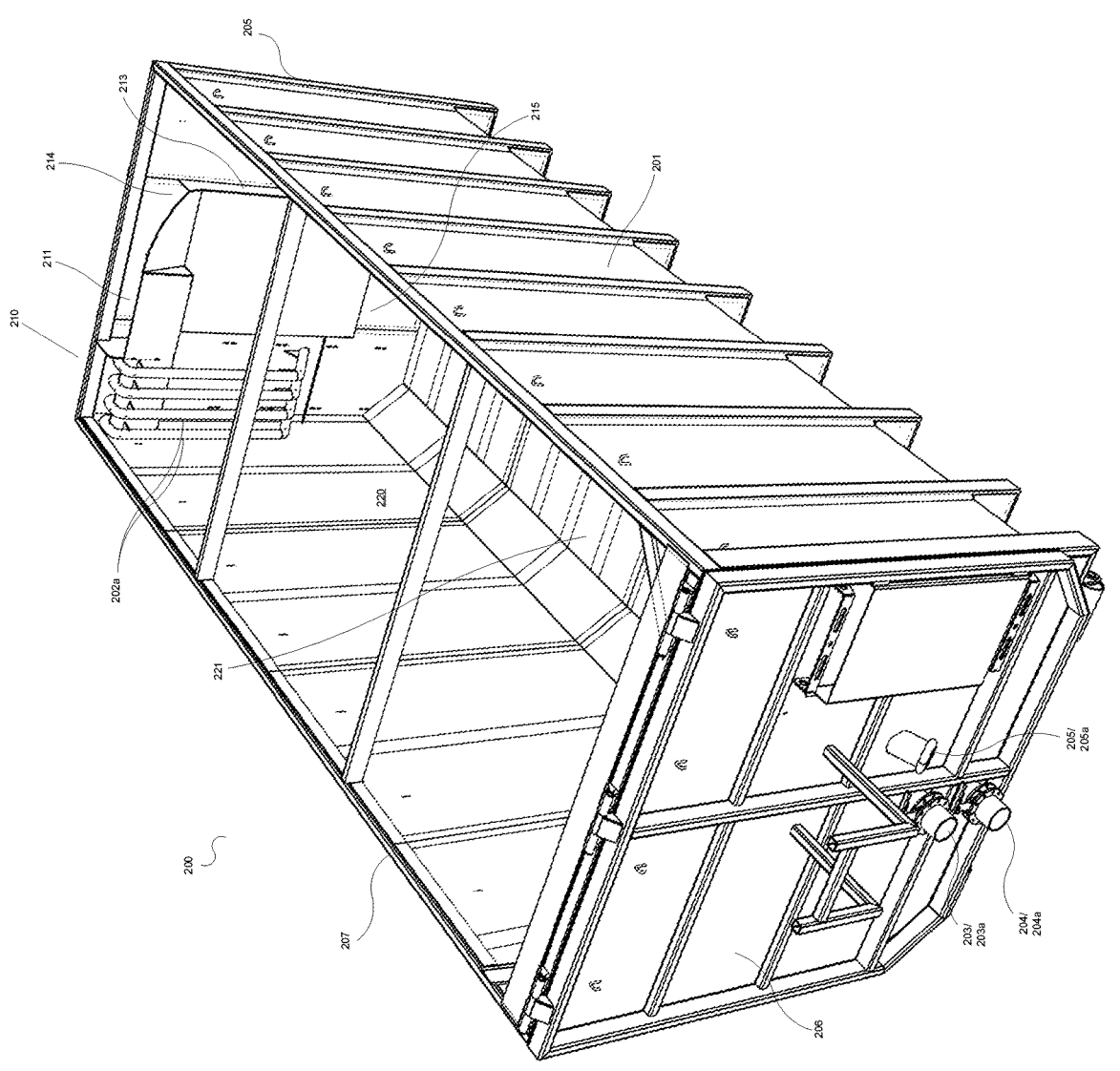
FIG. 7 is a perspective top view of the device shown in FIG. 5, seen from yet a different perspective.
Figure 8:
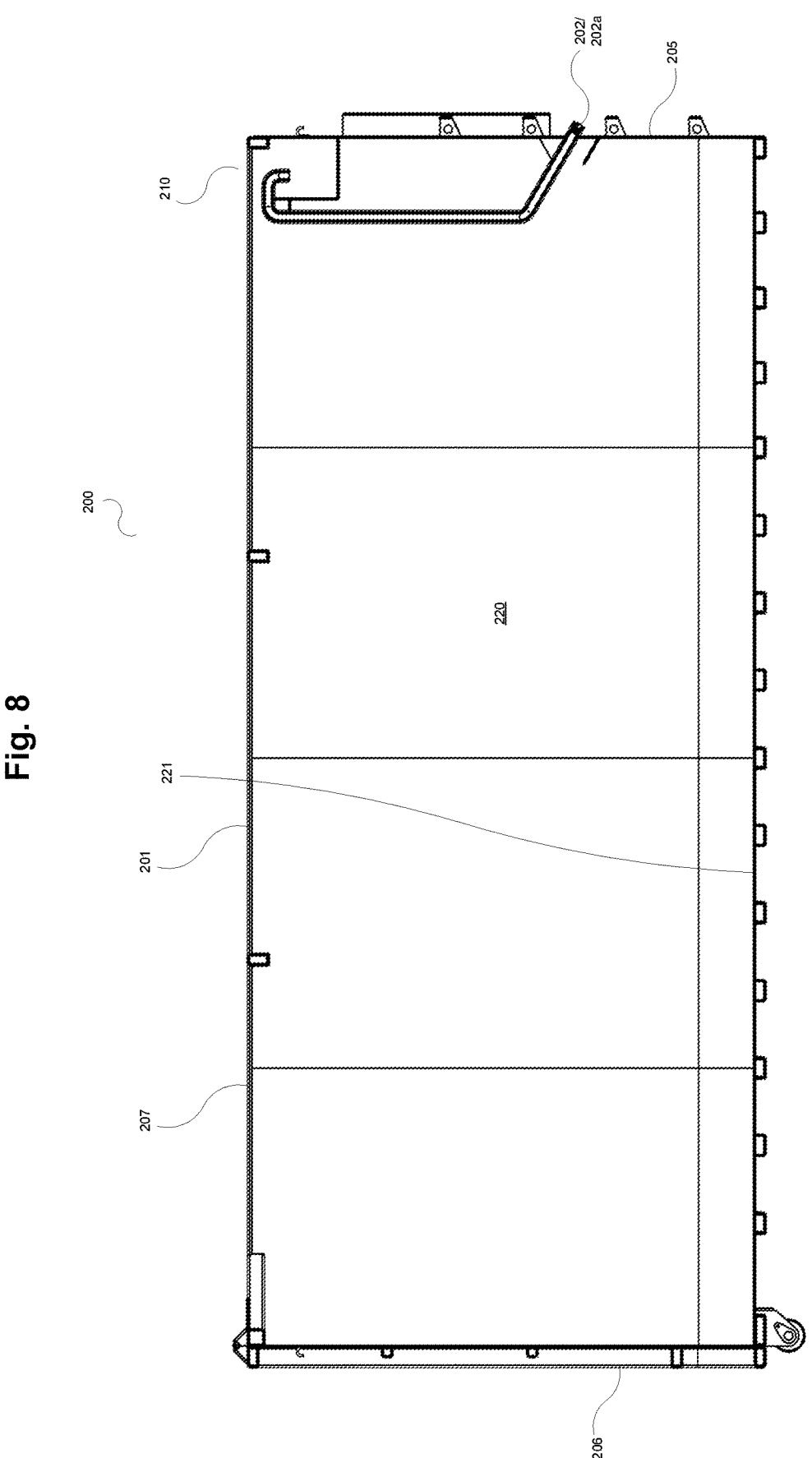
FIG. 8 is a side plan view of the device shown in FIG. 5, with a third cross-section removed, said third cross-section running through a flocculant provision means of the device in question.
Figure 9:
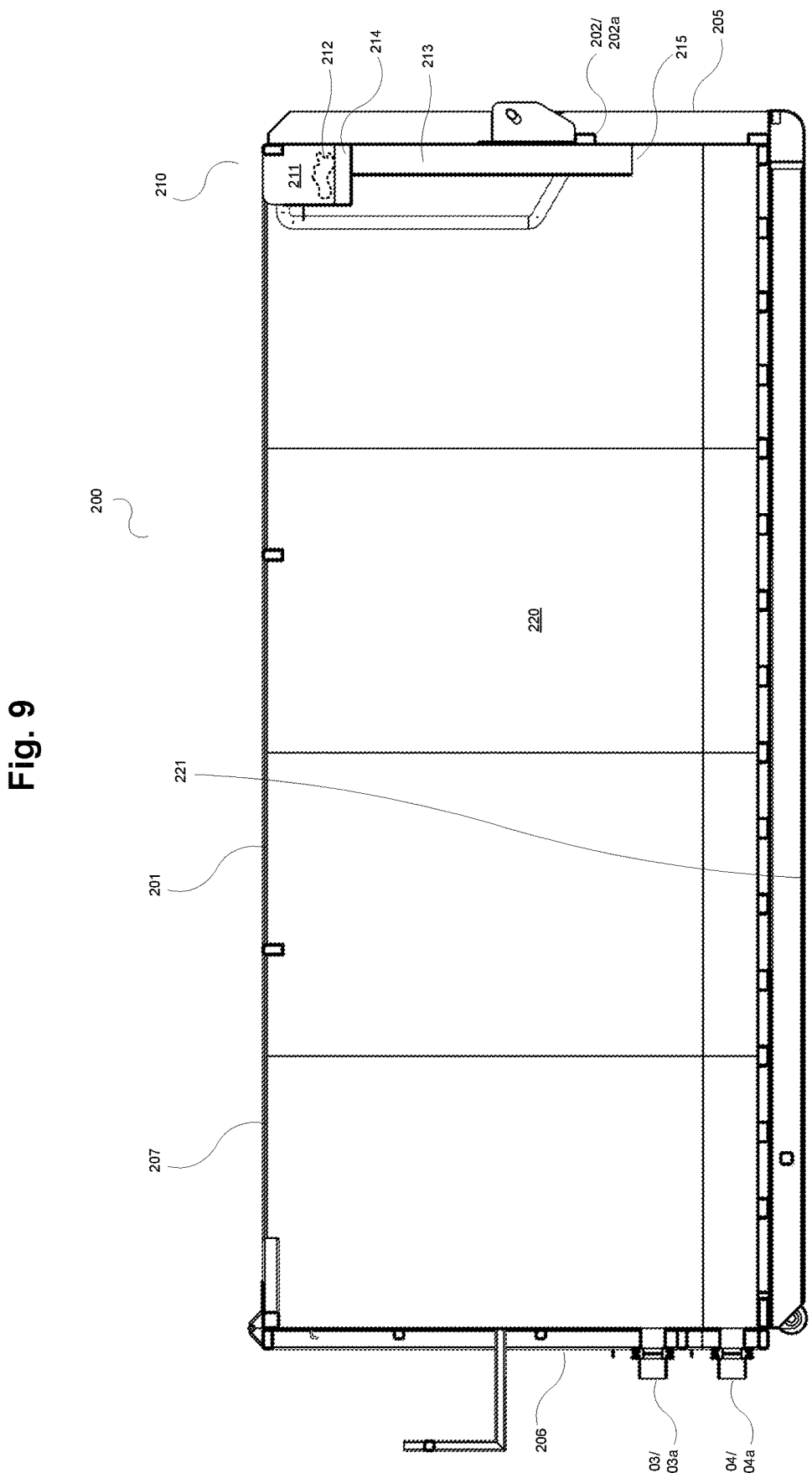
FIG. 9 is a side plan view of the device shown in FIG. 5, with a fourth cross-section removed, said fourth cross-section running through a slurry exit of the device in question.
Figure 10:
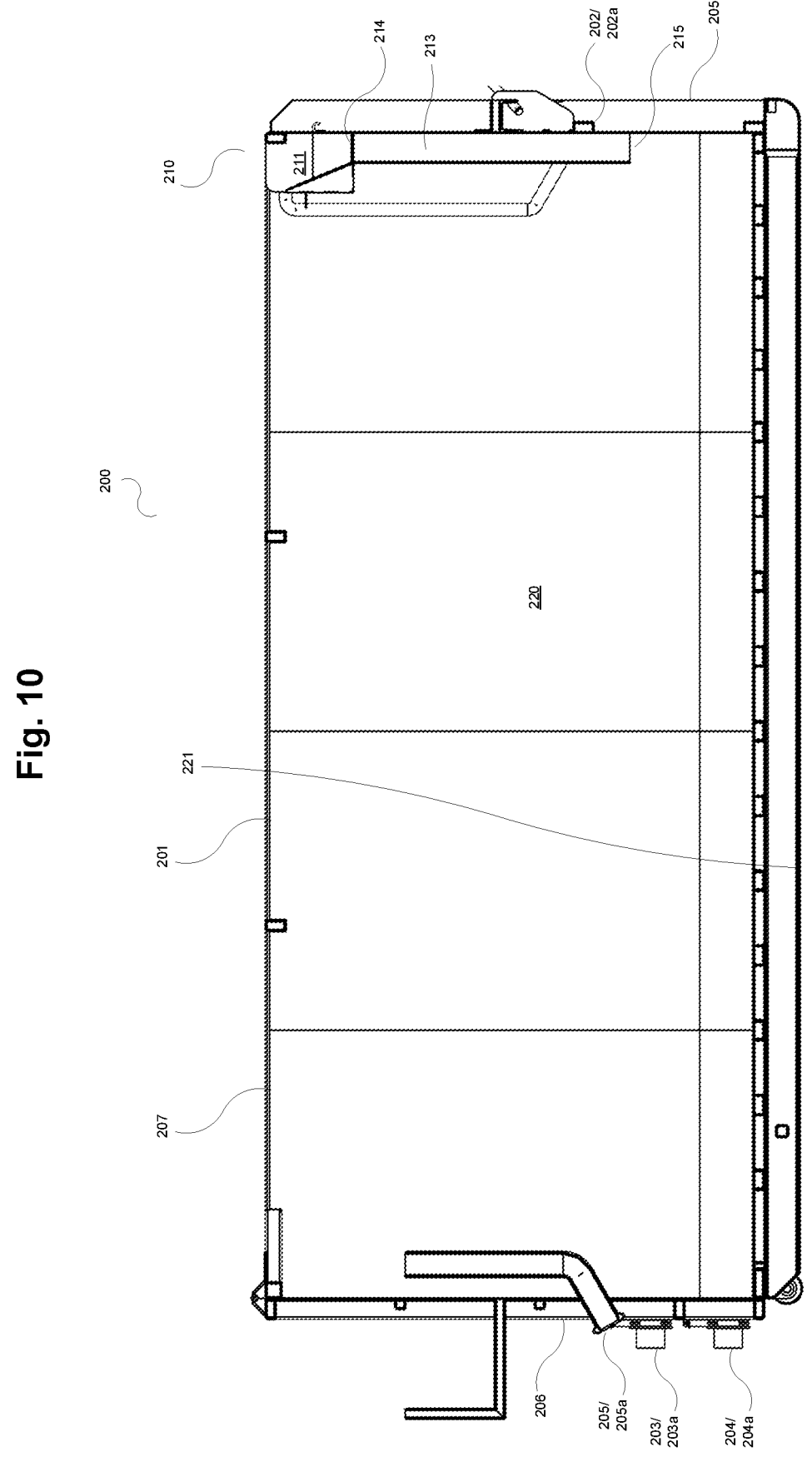
FIG. 10 is a side plan view of the device shown in FIG. 5, with a fifth cross-section removed, said fifth cross-section running through a top water exit of the device in question.

In the preferred embodiment presented in FIGS. 3 and 4, the separating wall 150, 160 constitutes a front (as seen in said general flow direction) limiting wall 156, 166 of the through channel 151, 161, defining the through hole 157, 167 at the lower end of the channel 151, 161, and the through channel 151, 161 is further defined by an additional, back, limiting wall, running beside, such as in parallel to, the front limiting wall 156, 166 down to the lower outlet 153, 163, these limiting walls defining the through channel 151, 161 between them. The flange 155, 165 may then be formed in connection to a joint between the back limiting wall and the separation wall 150, 160. The flange 155, 165 may even be the continuation of the back limiting wall running past the through hole 157, 167.

The through hole 157, 167 may run across the entire lateral width of the separation wall 150, 160 in question; only run across a part of said lateral width; be arranged in the form of several individual through holes; or in any other suitable manner.

Such through channel 151, 161 designs provide for very simple yet sturdy and reliable constructions.

Moreover, the lower outlet 153, 163 of the through channel 151, 161 may be arranged to release the water into said downstream sedimentation volume 130, 140 at a height from a bottom 131, 141 of said downstream sedimentation volume 130, 140 of at least 0.6 m, such as of at least 0.8 m, such as of at least 1 m, such as of at least 1.2 m.

As is illustrated in FIGS. 1-4, the lower outlet 163 of a downstream-arranged through channel 162 may be arranged to release the water into its downstream sedimentation volume 140 at a height that is lower, such as at least 0.3 m lower, than a height at which the lower outlet 153 of an upstream-arranged through channel 152 is arranged to release 70 the water into its downstream sedimentation volume 130. In this and in other embodiments, each through channel 151, 161 may have substantially the same vertical length, such as differ less than ±20% in vertical length.

Each through channel 151, 161 may extend at least 0.5 m in the height direction.

As mentioned, the container 101 may comprise at least three sedimentation volumes 120, 130, 140, each pairwise separated by a respective separation wall 150, 160 of the type described herein. Then, the container 101 may be arranged to convey the grey water, via gravity, through said sedimentation volumes 120, 130, 140 in series. In other words, the grey water enters each through channel 151, 161 via overflow from a respective upstream sedimentation volume 120, 130, and runs, via gravity and said through channel 151, 161, down and into the respective downstream sedimentation volume 130, 140. Entering via the water entry 102, the grey water can then travel, by gravity, all the way to the water exit 103.

It is realized that this will only occur once the container 101 is filled with grey water up to the level of each of the through cannel 151, 161 inlets 152, 162, after which additional grey water is supplied via water entry 102. However, it is preferred that no pumps, impellers or similar are provided in the container 101 for achieving said grey water circulation, even if the above-discussed grey water supply hose may of course be subjected to a pumping action to provide the grey water, possibly pressurized, at the water entry 102. The corresponding applies to the container 201.

Moreover, in the exemplifying embodiment illustrated in FIGS. 1-4, a respective through channel 161 upper inlet 162 of a downstream-arranged one 160 of said separation walls is lower than a respective through channel 151 upper inlet 152 of an upstream-arranged one 150 (such as the most upstream arranged) of said separation walls. Due to the overflow flowing of water into each of said through channels 151, 161, this will lead to a water surface arranged in the upstream sedimentation volume 120 or 130 being higher, during operation, than a water surface arranged in the downstream sedimentation volume 130 or 140, respectively.

Each of said separation walls 150, 160 may be inclined at an angle 158, 168 of between 10° and 45° in relation to the vertical. Each of said separation walls 150, 160 may further be flat or substantially flat, at least having a flat surface facing its respective downstream-arranged sedimentation volume 130, 140, possibly apart from an area in connection to its through channel 151, 161 outlet 153, 163. Such flatness facilitates emptying by tipping of the container 101.

As is illustrated in FIGS. 1-4, each of said separation walls 150, 160 slants away from the water exit 103, or, more generally, has an angle in relation to the horizontal which is larger on a downstream side of the separation wall 150, 160 in question as compared to on an upstream side of the separation wall 150, 160 in question. Angle 168 illustrated in FIGS. 3 and 4 in relation to exemplifying separation wall 160 is the angle on the downstream side of the separation wall 160 in relation to the horizontal, the angle 168 being >90°.

The water exit 103 may comprise an inlet 103a to the water exit 103, arranged so that cleansed water is collected from an upper part of a downstream-most arranged sedimentation volume 140 and is fed, by gravity, into the water exit 103 for disposal.

The container 101 may have an open or openable top 107, via which sedimented particulate material can be evacuated by tipping the container 101 as described above.

Moreover, the container 101 may have a total volume of between 8 and 20 m³. This volume may also be a total volume of the sedimentation volumes 120, 130, 140 in the container 101. The total grey water capacity of the container 101 may be between 6 and 18 m³.

Figure 13:
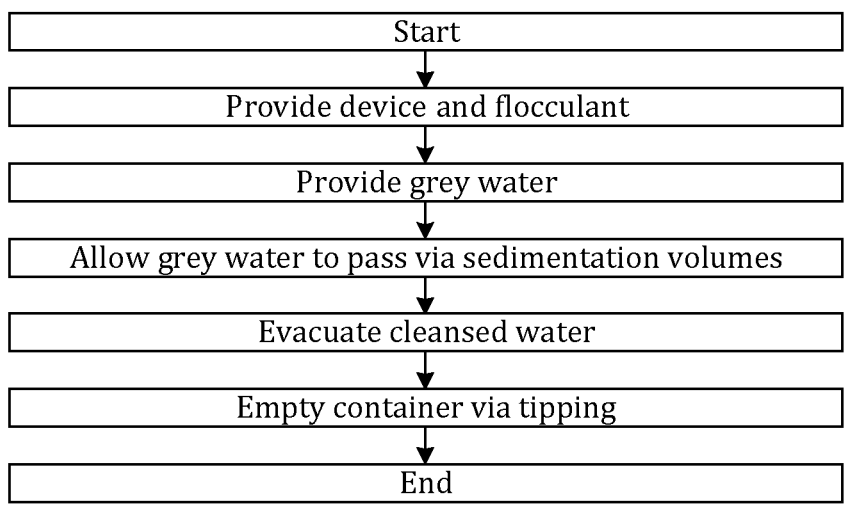
FIG. 13 is a flowchart illustrating a method according to said first aspect.

FIG. 13 illustrates a method for cleaning grey water of the above-described type, using a container 100 of the described type.

In a first step, the method starts.

In a subsequent step, the device 100 in question is provided, comprising said container 101 and said flocculant provided in the flocculant provision means 110. After this step, the device 100 is prepared to receive grey water.

In a subsequent step, grey water is provided to said water entry 102, such as under pressure. Before entering the upstream-most arranged sedimentation volume 120, sufficient flocculant is added to the grey water for sufficient sedimentation, as described above.

In a subsequent step, the grey water is allowed to pass, also in the way described above, via said sedimentation volumes 120, 130, 140 in order, the particulate material settling (sedimenting) on a bottom 121, 131 of said upstream sedimentation volume 120, 130 and on a bottom 131, 141 of said downstream sedimentation volume 130, 140.

In a subsequent step, the cleansed grey water is evacuated via said water exit 103. The device 100 may be operated in a continuous manner, by grey water continuously or intermittently being supplied via the water entry 102, and by cleansed water continuously or intermittently being evacuated via the water exit 103. The flow velocity may be controlled to achieve sufficient sedimentation during the total holding time of the grey water through the container 101. For instance, the flow velocity may be controlled, by controlling a cleansed water average evacuation flow volume per time unit, so that the grey water is held in the container for a total time of at least 0.1 hours, such as at least 0.5 hours, such as at least 1 hour, before it can be evacuated in cleansed state. Normally, the water will be sufficiently sedimented for emptying of cleansed water after a maximum of 5 hours.

In general, the device 100 may be arranged to treat at least 5 m³, such as at least 10 m³, grey water per hour, in a continuous flow operation. Furthermore, the device 100 may be arranged to treat at most 50 m³, such as at most 30 m³, grey water per hour, in a continuous flow operation. The particular device 100 as shown in FIGS. 1-4 can handle about 20 m³ grey water per hour in continuous flow operation, yielding acceptable cleaning results. These numbers are provided for a standard grey water, resulting from drilling into granite when preparing a geothermal well.

In a subsequent step, the container 101 is tipped, to thereby empty it at least partly from sedimented particulate material via said open or openable top 107 of the container 101.

As is illustrated in FIGS. 1-4, the container 101 may not have any evacuation hole for sedimented particulate material, but may be arranged for emptying of such material via said open or openable top 107. The emptying itself may take place via tipping, but alternatively via suction or similar.

In a subsequent step, the method ends.

SECOND ASPECT

FIGS. 5-12 illustrate a device 200 according to the second aspect. As mentioned above, the device 200 is specifically arranged for cleaning grey water, containing particulate material, of the above-described type.

In general, all which has been said in relation to the device 100 according to said first aspect is equally applicable to the device 200 according to the second aspect, and vice versa, as applicable. In particular, what has been said about corresponding parts (sharing the same two last reference number digits) is equally applicable to both devices 100, 200, unless stated otherwise or unless incompatible.

Hence, the device 200 comprises a container 201, in turn comprising a water entry 202, a slurry exit 204, a cleansed water exit 203 and a sedimentation volume 220.

The "slurry exit" 204 is hence an exit for sedimented particulate material ("slurry") having been separated from the cleansed grey water.

According to this second aspect, the container 201 further comprises a flocculant provision means 210, arranged to add a flocculant 212 (see FIGS. 11 and 12) to grey water entering via the water entry 202, so that grey water having entered said sedimentation volume 220 after such adding contains said flocculant 212. As described above in relation to flocculant provision means 110, the flocculant provision means 210 is arranged to provide sufficient flocculant to the water in the sedimentation volume 220 so as to achieve sufficient sedimentation for the purposes at hand and the conditions in terms of volumetric flow per time unit, particulate material contents, used flocculant, and so forth. In general, the flocculant provision means 210 corresponds to the flocculant provision means 110, and may share the corresponding features, in particular in relation to the rest of the container 201 and the operation of device 200.

Further according to this second aspect, the flocculant provision means 210 comprises a vertical chute 213, arranged to convey, via gravity, the grey water from an upper part of the container 201 to be released via an open lower end 215 of the chute 213 into said sedimentation volume 220 at a height of at the most 1 m above a bottom 221 of the sedimentation volume 220.

Preferably, all grey water being supplied to the sedimentation volume 220 is provided via said chute 213.

Preferably, the chute 213 is arranged to convey grey water from the flocculant provision means 210, such as from a flocculant adding space 211, to the sedimentation volume 220. It is, again, realized that not all grey water needs to be exposed to the flocculant 212 in the flocculant provision means, as long as the average flocculant concentration is sufficient inside the sedimentation volume 220. In case all provided grey water does not pass via the flocculant 212, it is still preferred that all grey water is conveyed into the sedimentation volume 220 via the chute 213.

Further according to this second aspect, the chute 213 has a cross-sectional area of at least 0.1 m², such as at least 0.2 m², such as at least 0.4 m², such as at least 0.6 m². The particular chute 213 illustrated in FIGS. 5-12 has cross-sectional dimensions of about 0.8 m by 0.3 m. The chute 213 may have any suitable form, but preferably has a cross-section with a smallest cross-sectional diameter being at least 20% the length of a largest cross-sectional diameter at any one vertical location along the chute 123.

The present inventors have discovered that, for a sedimentation volume 220 used with a flocculant 212, if the grey water is supplied via such a relatively large-cross-section chute, terminating at such relative closeness to the sedimentation volume 220 bottom 221, the supplied grey water does not stir up the sedimented particulate material sufficiently for preventing efficient sedimentation of particulate material from the flocculant-holding grey water. This is true, in particular for larger sedimentation volumes (see below), even in case the container 201 only contains one single sedimentation volume 220.

Preferably, the chute 213 is completely or substantially straight, in the sense that most, or substantially all, of the grey water passing downwards through the water-filled chute 213 into an at least partly water-filled sedimentation volume 220 will travel in a laminar fashion along a substantially straight line along the entire (or substantially entire) water-filled length of the chute 213.

Preferably, the chute 213 is completely or substantially vertical, in the sense that most, or substantially all, of the grey water passing downwards through the water-filled chute 213 into an at least partly water-filled sedimentation volume 220 will travel in a laminar fashion substantially vertically along the entire (or substantially entire) water-filled length of the chute 213.

As used here, the term "at least partly water-filled sedimentation volume 220" means that the sedimentation volume 220 is sufficiently filled with water so as to result in a substantially laminar water flow downwards through the chute 213 as grey water is added at the top of the chute 213. It is realized that in a water surface in the sedimentation volume 220 must always be lower or the same as a water level at the point of grey water addition into the chute 213, so that the laminar downwards flow of grey water is driven solely by gravity, achieving a water level equilibration.

During operation, the chute 123 is preferably substantially completely filled, or at least filled to at least 50%, or preferably to at least 75%, with grey water travelling downwards. This may be achieved by a passage hole from the flocculant adding space 211 to the chute 123 being sufficiently small, such as at the most 0.01 m². During continuous operation, however, a water level in the sedimentation volume 220 may be sufficiently high so as to fill the chute 123 sufficiently due to the fact that the volume 220 and the chute 123 communicate.

The chute 213 is preferably at least 1.5 meters of height, such as at least 2 meters of height, in the sense that all added grey water being conveyed via the chute 213 from the flocculant adding space 211 travels this vertical distance through the chute 213 before being released into the sedimentation volume 220.

Preferably, the grey water travels downwards through the chute 213 at a velocity of at least 0.01 m/s and/or at the most 0.15 m/s when adding grey water during continuous operation.

In some embodiments, the slurry exit 204 comprises a slurry evacuation hole 204a from said sedimentation volume 220 arranged at a height of at the most 0.5 m, such as at the most 0.4, above said bottom 221. Preferably, the slurry exit 204 is arranged to only directly evacuate sedimented particulate material being present in the container 201 at this maximal height or lower.

In some embodiments, the cleansed water exit 203 may furthermore comprise a cleansed water evacuation hole 203a from said sedimentation volume 220, which may then be arranged above said slurry evacuation hole 204a. The cleansed water exit 203 may be arranged to only directly evacuate cleansed water being present in the container 201 above said maximal height in relation to the slurry exit 204, such as at least 0.2 m or even at least 0.4 m above said maximal height.

As is illustrated in FIGS. 5-12, the container 201 may comprise, in addition to or instead of the cleansed water exit 203, a top water exit 205, arranged to directly evacuate cleansed water, via a top water evacuation hole 205a, from a top part of the container 201. The top water exit 205 may be arranged to directly evacuate cleansed water from a topmost 50%, such as a topmost 70%, of a total height of the container 201. The top water exit 205 may constitute an overflow exit for cleansed water, automatically evacuating a topmost share of the water as the water surface passes above a level for the top water exit 205, such as during continuous operation.

Similarly to the flocculant provision means 110 of device 100, the flocculant provision means 210 of the device 200 may comprise a flocculant adding space 211 in turn containing a flocculant, such as a solid-state flocculant 212. The flocculant 212 may be of the type discussed above in relation to flocculant 112, and may as such for instance be aluminium sulphate. The device 201 may then be arranged so that (at least part of) the grey water to be cleansed entering via the water entry 202 flows, in direct contact with said flocculant 212, before entering the sedimentation volume 220.

The chute 213 may be arranged to release the grey water at a height in the container 201 which is higher than any cleansed water evacuation hole 203a provided to evacuate cleansed water from the sedimentation volume 220. Preferably, the exit 215 of the chute 213 is arranged at a height being higher than a maximal height from which cleansed water is directly evacuated from the sedimentation volume 220 via the cleansed water exit 203, and preferably also via any top water exit 205.

In some embodiments, the chute 213 is arranged to release the grey water into the sedimentation volume 220 at a first short end 205 of the container 201 or sedimentation volume 220, while the slurry exit 204 is arranged at an opposite, second short end 206 of the container 201 or sedimentation volume 220. In other words, slurry exit 204 is arranged to directly evacuate sedimented particulate material from the sedimentation volume 220 from a location within said sedimentation volume 220 being entirely arranged at an opposite horizontal side of the sedimentation volume 220 as compared to the location within the sedimentation volume 220 to which the grey water is released by the chute 213.

In this case, said cleansed water exit 203 is preferably also arranged at said second short end 206 of the container 201 or sedimentation volume 220, such that the cleansed water exit 203 is arranged to directly evacuate cleansed water from a location entirely arranged at said second short end 206.

If a top water exit 205 is used, this may also be arranged to directly evacuate cleansed top water from said same short end 206. This is illustrated in FIGS. 5-12.

As is also illustrated in FIGS. 5-12, the slurry exit 204 (slurry evacuation hole 204a), the cleansed water exit 203 (cleansed water evacuation hole 203a) and any top water exit 205 (top water evacuation hole 205a) may be horizontally aligned, such as horizontally centrally on the container 201. However, these parts 204/204a, 203/203a, 205/205a may also be horizontally displaced in relation to each other.

The present inventors have surprisingly found that the solution according to this second aspect provides adequate results in terms of sedimentation and cleaning throughput even if using only one single sedimentation volume. In general, it is preferred that the sedimentation volume 220 is a single, connected volume occupying at least 90% of a total interior volume of the container 201. That the volume is "connected" means, herein, that water inside the sedimentation volume 220 may freely move, by circulation in the absence of externally provided propulsion energy, across the entire volume 220 in a horizontal plane above a surface of sedimented particulate matter resting on the bottom 221 of the sedimentation volume 220. In particular, there are preferably no overflow or other connections between otherwise separate sedimentation volumes, possibly apart from smaller ridges or similar at the bottom 221, that are then provided for constructional stability or similar.

It is understood that the device 200 may comprise several sedimentation volumes, in a manner corresponding to the case for device 100, but that it is preferred that device 200 only has one sedimentation volume 220 due to reasons of simplicity in terms of manufacturing, use and handling. Correspondingly, the device 100 may be provided with a chute 213 of the type described herein, connecting the flocculant provision means 110 with the upstream-most sedimentation volume 120.

Figure 11:
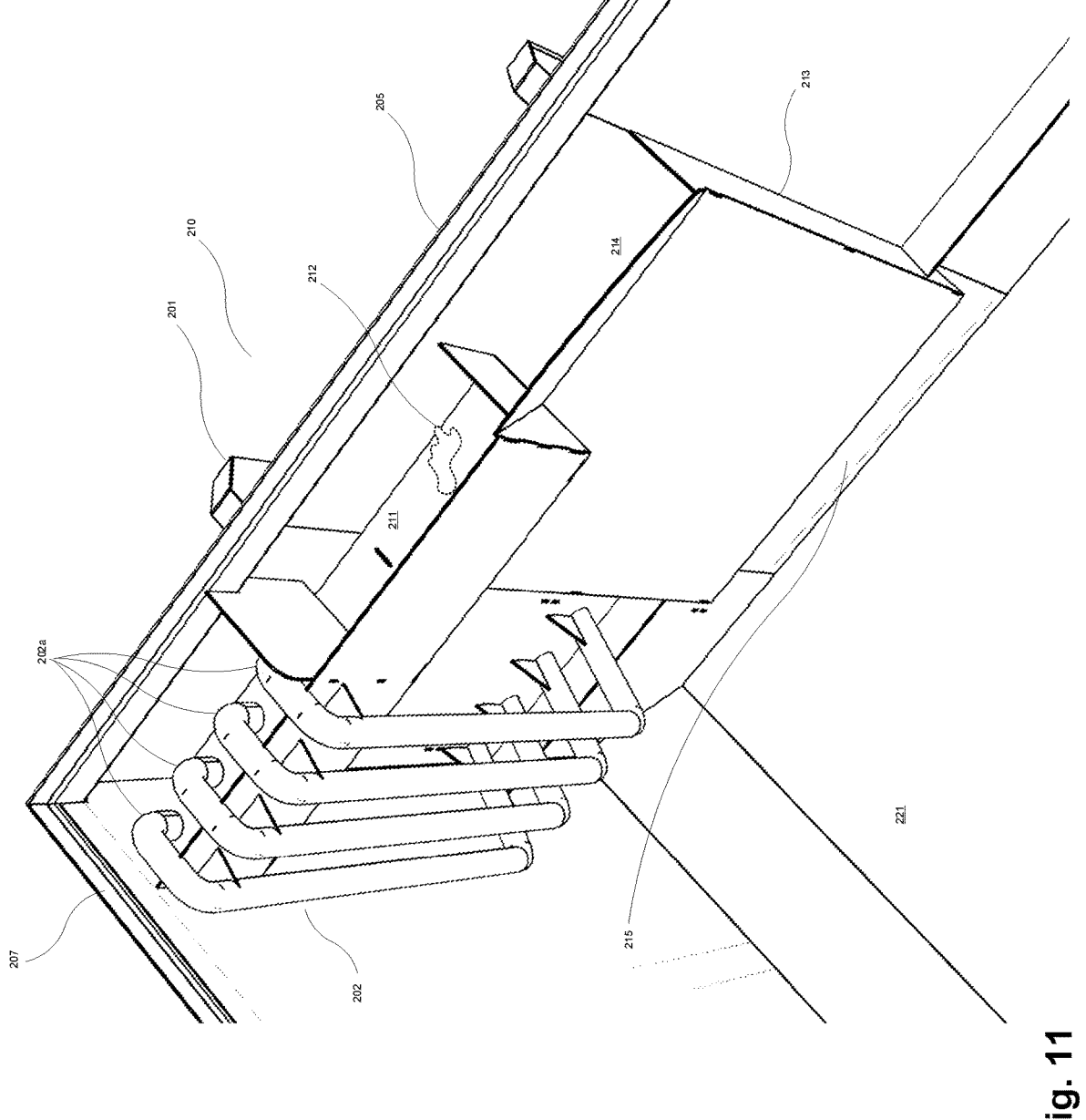
FIG. 11 is a perspective detail view of a flocculant provision means of the device shown in FIG. 5.
Figure 12:
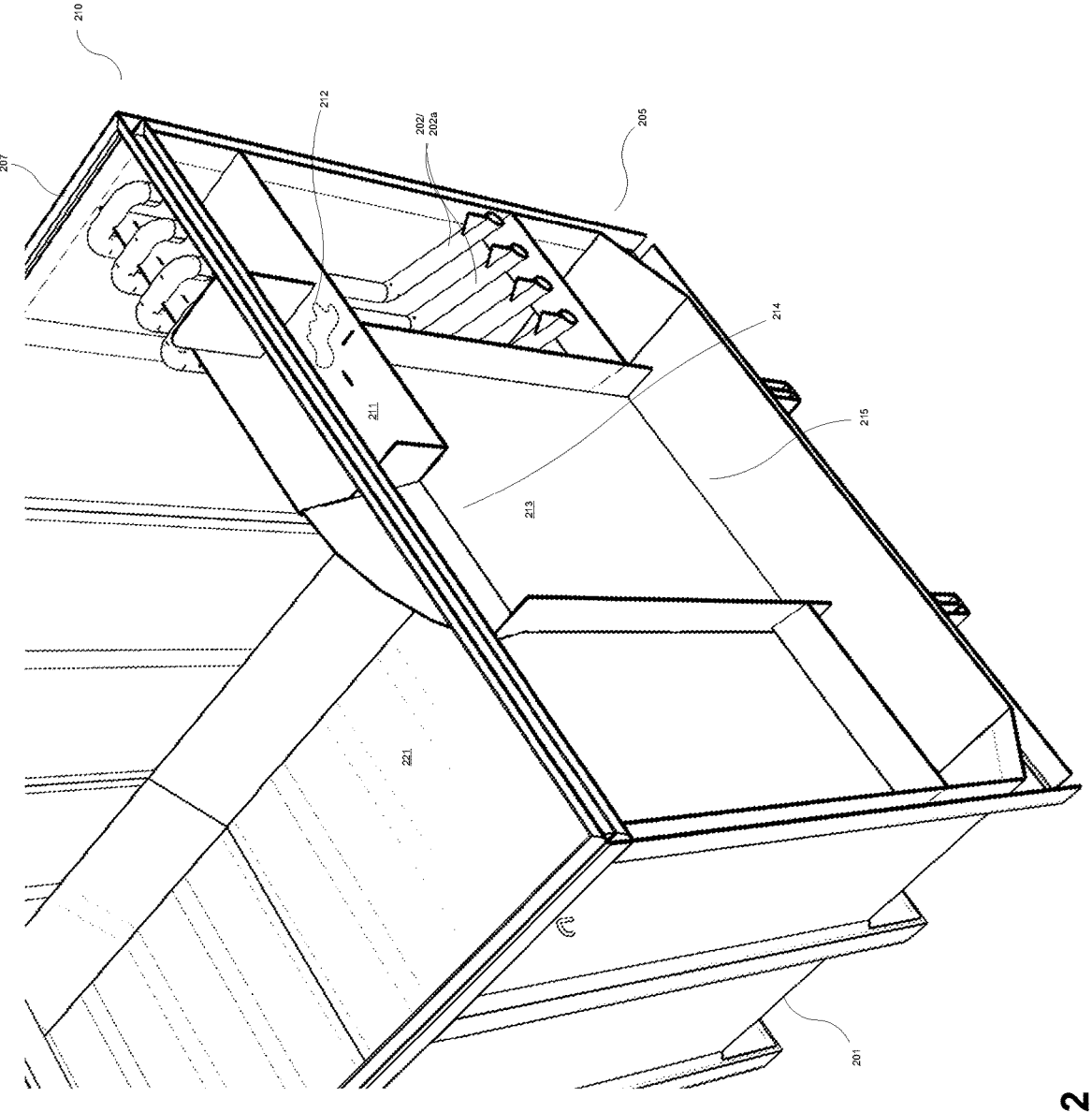
FIG. 12 is a perspective detail view of the flocculant provision means shown in FIG. 11 from a different perspective, with a short-end section removed.

As is shown in the example of FIGS. 5-12, and perhaps most clearly in FIGS. 11-12, the water entry 202 may comprise two or more grey water connections 202a, such as at least three or even at least four grey water connections 202a, arranged to accept grey water in two or more parallel streams that are all emptied into, and mixed in, said flocculant provision means 210. Connections 202a may be in the form of separate conduits for grey water, each arranged to release grey water into the flocculant provision means 110 in parallel flows. Using such parallel connections 202a, grey water from several different sources can be handled in parallel using one and the same device 200.

In a way corresponding to device 100, the container 201 may have an open or openable top 207, via which sedimented particulate material can be evacuated by tipping the container 201 and/or via pumping or suction.

Preferably, the container 201 and/or the sedimentation volume 220 has a volume of between 15 and 40 m³. The total grey water capacity of the container 201 may be between 12 and 35 m³.

Figure 14:
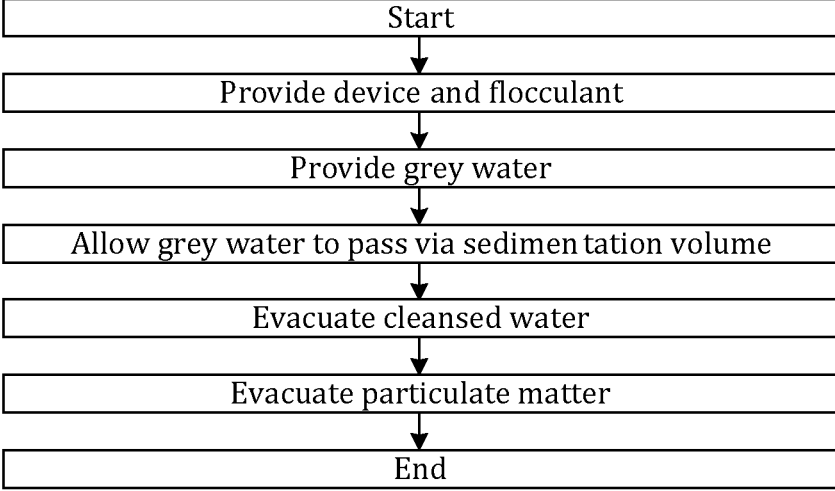
FIG. 14 is a flowchart illustrating a method according to said second aspect.

FIG. 14 illustrates a method for cleaning grey water of the above-described type, using a container 2100 of the described type.

In a first step, the method starts.

In a subsequent step, a device 200 of the type described herein is provided, comprising a container 201 and the flocculant 212 provided in the flocculant provision means 210. After this step, the device 200 is prepared to receive grey water.

In a subsequent step, grey water is provided to said water entry 202, such as under pressure. Before entering the sedimentation volume 220, sufficient flocculant is added to the grey water for sufficient sedimentation, as described above.

In a subsequent step, the grey water is allowed to pass, also in the way described above, via said chute 213 and into the sedimentation volume 220, the particulate material settling on a bottom 221 of the sedimentation volume 220.

In a subsequent step, the cleansed grey water is evacuated via the water exit 203 and/or via the top water exit 206. As is the case with device 100, the device 200 may be operated in a continuous manner, by grey water continuously or intermittently being supplied via the water entry 202, and by cleansed water continuously or intermittently being evacuated via water exit 203. The flow velocity may be controlled to achieve sufficient sedimentation during the total holding time of the grey water through the container 201. For instance, the flow velocity may be controlled, by controlling a cleansed water average evacuation flow volume per time unit, so that the grey water is held in the container for a total time of at least 0.3 hours, such as at least 1 hour, before being evacuated in cleansed state. Normally, the water will be sufficiently sedimented for emptying of cleansed water after a maximum of 5 hours.

In general, the device 200 may be arranged to treat at least 20 m³, such as at least 30 m³, grey water per hour, in a continuous flow operation. Furthermore, the device 200 may be arranged to treat at most 100 m³, such as at most 50 m³, grey water per hour, in a continuous flow operation. The particular device 200 as shown in FIGS. 5-12 can handle about 40 m³ grey water per hour in continuous flow operation, yielding acceptable cleaning results. These numbers are, again, provided for a standard grey water, resulting from drilling into granite when preparing a geothermal well.

In a subsequent step, sedimented particulate material is evacuated via the slurry exit 204, such as by connecting a hose to the slurry evacuation hole 204a and allowing the sedimented particulate material to exit via the hose. The hose may be subjected to an underpressure (pumping), or the evacuation may take place using only the overpressure provided by the water above the slurry exit 204 in the sedimentation volume 220. The particulate material may also be evacuated via pumping/suction, or even via tipping of the container 201, to thereby empty it at least partly from sedimented particulate material via said open or openable top 207 of the container 201.

In a subsequent step, the method ends.

In one mode of operation, the amount of grey water supplied to the device 200 is so low that the container takes at least a full working day or shift to fill. For instance, this may imply that the average supply of grey water per hour during the working day is at the most about 5 m³ (or at the most about 10% or at the most about 20% of a total cleaning capacity for continuous flow operation). Then, emptying of the container 201 may not take place the same day, but at the beginning of a next working day, such as after a pause of between 6 and 12 hours during the night or between work shifts. This provides additional time for the particulate material to sediment, providing excellent cleaning results of sufficient amounts of grey water for many small-scale operations.

As mentioned above, the grey water flowing downwards through said chute 213 during operation may have a flow velocity of between 0.01 m/s and 0.15 m/s during continuous operation at which time the sedimentation volume 220 is sufficiently full as discussed above.

As also mentioned above, the lower open end of the chute 213 may be arranged to, during operation, release the grey water below a water surface of said sedimentation volume 220.

In one embodiment, the sedimented particulate material on the bottom 221 of the sedimentation volume 220 (or at least a share of this sedimented particulate material) may first be evacuated via the slurry exit 204. Before this, cleansed water may be evacuated via the top water exit 205 and/or via the cleansed water exit 203. After said evacuation of the sedimented particulate material, the container 201 may be finally emptied via its open or openable top 207, such by pumping/suction of the remaining slurry, or even via tipping of the container 201. In some embodiments, a side of the container 201 may also be arranged to be removed or swung open, so that the entire container 201 can be cleaned out from any remaining contents without having to tip the container 201.

Regarding the amount of flocculant to use, this will depend on the prerequisites. As a simple example, about 10-50 kg of solid-state aluminium sulphate can be added to the flocculant addition space 111, 211 about once every 10 hours of continuous operation.

Above, preferred embodiments have been described. However, it is apparent to the skilled person that many modifications can be made to the disclosed embodiments without departing from the basic idea of the invention.

It is understood that the Figures illustrate two exemplifying embodiments, and that these embodiments can be varied in terms of details in many ways. As mentioned above, the various principles described herein with reference to either of these two embodiments can be freely combined, as applicable and compatible.

Furthermore, all which has been said in connection to devices 100, 200 is freely applicable to the corresponding methods described herein, and vice versa, pending applicability and compatibility.

Hence, the invention is not limited to the described embodiments, but can be varied within the scope of the enclosed claims.

The invention claimed is:

1. A device for cleaning water accruing from drilling in the ground, the water containing particulate material, the device comprising a container in turn comprising:

a water entry;

a slurry exit;

a cleansed water exit; and a sedimentation volume, wherein the container further comprises a flocculant provision means, arranged to add a flocculant to water entering via the water entry, so that water having entered said sedimentation volume after such adding contains said flocculant, and wherein the flocculant provision means comprises a vertical chute arranged to convey, via gravity, said water from an upper part of said container to be released via an open lower end of the chute into said sedimentation volume at a height of at the most 1 m above a bottom of said sedimentation volume, the chute having a cross-sectional area of at least 0.1 m², wherein the container has an open or openable top, via which sedimented particulate material can be evacuated by tipping the container.

2. The device according to claim 1, wherein said slurry exit comprises a slurry evacuation hole from said sedimentation volume arranged at a height of at the most 0.5 m above said bottom.

3. The device according to claim 2, wherein said cleansed water exit comprises a cleansed water evacuation hole from said sedimentation volume arranged above said slurry evacuation hole.

4. The device according to claim 1, wherein the flocculant provision means comprises a flocculant adding space containing a solid-state flocculant, such as aluminum sulfate, past which water entering via the water entry flows, in direct contact with said flocculant, before entering said sedimentation volume.

5. The device according to claim 1 wherein the chute is arranged to release the water at a height which is higher than any cleansed water evacuation hole provided to evacuate cleansed water from the sedimentation volume.

6. The device according to claim 1, wherein the chute is arranged to release the water at a first short end of the container or sedimentation volume, while the slurry exit is arranged at an opposite, second short end of the container or sedimentation volume.

7. The device according to claim 6, wherein the cleansed water exit is also arranged at said second short end of the container or sedimentation volume.

8. The device according to claim 1, wherein the sedimentation volume occupies at least 90% of a total interior volume of the container.

9. The device according to claim 1, wherein the water entry comprises two or more water connections, arranged to accept water in two or more parallel streams that are all emptied into, and mixed in, said flocculant provision means.

10. The device according to claim 1, wherein the container has a volume of between 15 m³ and 40 m³.

11. A method for cleaning water accruing from drilling in the ground, the water containing particulate material, the method comprising the following steps:
a) providing a device according to claim 1, comprising a container and a flocculant;
b) providing water to said water entry;
c) allowing the water to pass via said chute into said sedimentation volume, the particulate material settling on a bottom of said sedimentation volume;
d) evacuating cleansed water via said cleansed water exit; and
e) evacuating sedimented particulate material via said slurry exit.

12. The method according to claim 11, wherein the water flowing downwards through said chute has a flow velocity of at the most 0.15 m/s.

13. The method according to claim 11, wherein the lower open end of the chute is arranged to release said water below a water surface of said sedimentation volume.

* * * * *